United States Patent
Morishita

(10) Patent No.: US 7,356,395 B2
(45) Date of Patent: Apr. 8, 2008

(54) INTER-DEVICE COMMUNICATION SYSTEM

(75) Inventor: Taiji Morishita, Kariya (JP)

(73) Assignee: Denso Corporation, Kariya (JP)

( * ) Notice: Subject to any disclaimer, the term of this patent is extended or adjusted under 35 U.S.C. 154(b) by 303 days.

(21) Appl. No.: 11/196,276

(22) Filed: Aug. 4, 2005

(65) Prior Publication Data

US 2006/0041352 A1 Feb. 23, 2006

(30) Foreign Application Priority Data

Aug. 20, 2004 (JP) .............................. 2004-241149

(51) Int. Cl.
*B60S 1/08* (2006.01)
(52) U.S. Cl. .......................... 701/37; 318/443
(58) Field of Classification Search .................. 701/37; 318/443, 444, 445, 483, DIG. 2; 15/250.02, 15/250.12, 250.13
See application file for complete search history.

(56) References Cited

U.S. PATENT DOCUMENTS

| | | | | |
|---|---|---|---|---|
| 3,649,898 A | * | 3/1972 | Inoue | 318/483 |
| 4,689,536 A | * | 8/1987 | Iyoda | 318/483 |
| 5,059,877 A | * | 10/1991 | Teder | 318/444 |
| 5,508,595 A | * | 4/1996 | Schaefer | 318/444 |
| 5,684,371 A | | 11/1997 | Tarui et al. | |
| 5,990,647 A | * | 11/1999 | Zettler | 318/483 |

FOREIGN PATENT DOCUMENTS

JP    2001-099948    4/2001

OTHER PUBLICATIONS

Aug. 10, 2007 Office Action issued in counterpart application No. (CN) 2005100926699 (and at least partial English translation).

* cited by examiner

*Primary Examiner*—Dalena Tran
(74) *Attorney, Agent, or Firm*—Nixon & Vanderhye P.C.

(57) ABSTRACT

An inter-device communication system for a wiper control apparatus that includes a rain detection device and a wiper driving device includes communication circuits having a transmission line for unidirectionally sending a rain detection signal to the wiper driving device, a transmission circuit arranged in the wiper driving device for short-circuiting a potential of the signal unidirectionally sent through the transmission line, and a recognition circuit arranged in the rain detection device for recognizing transmitting information sent in an opposite direction to a direction of the unidirectional transmission, i.e., from the wiper driving device to the rain detection device based on the short-circuited signal.

16 Claims, 4 Drawing Sheets

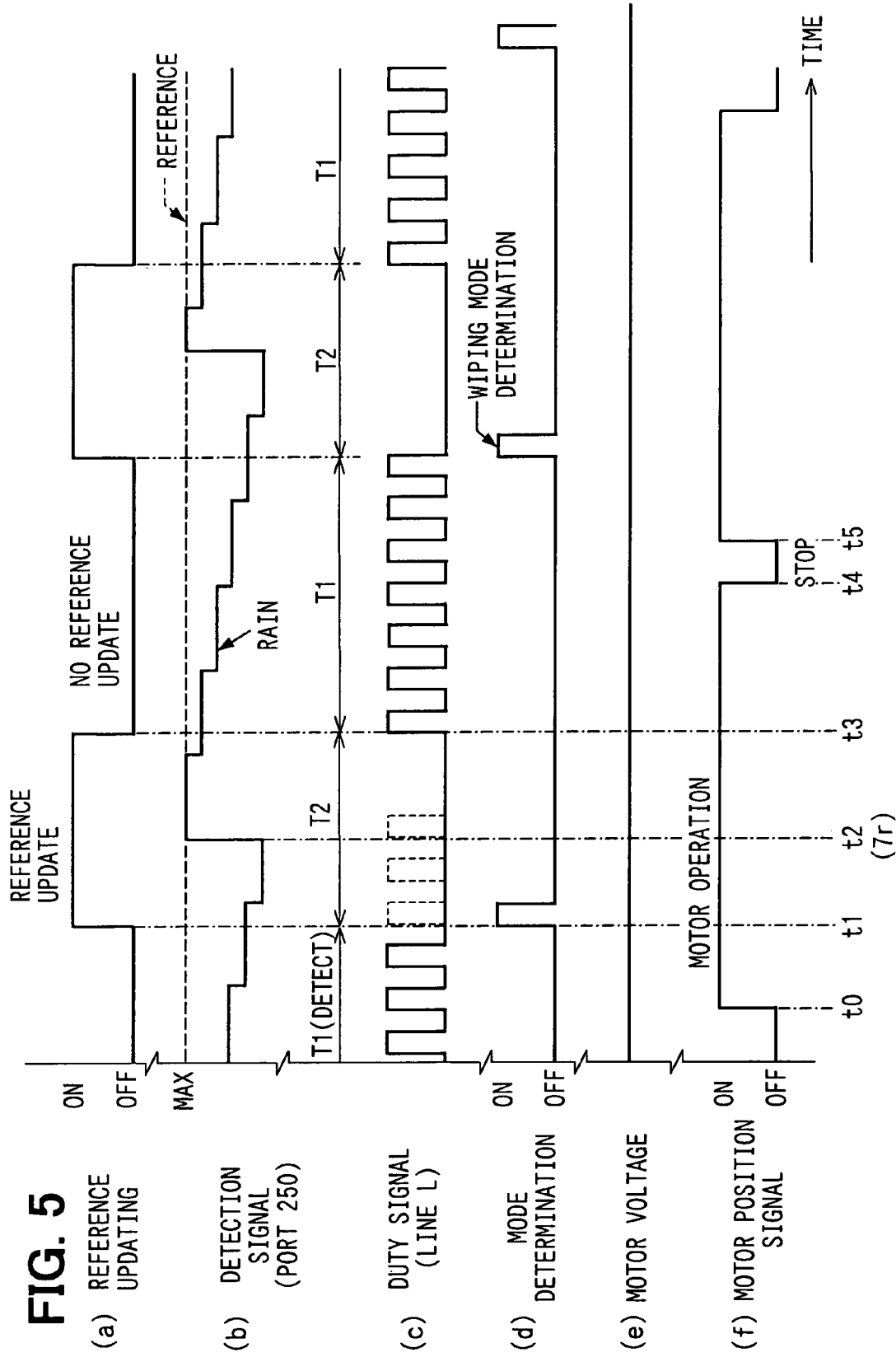

INTER-DEVICE COMMUNICATION SYSTEM

CROSS REFERENCE TO RELATED APPLICATION

This application is based on and incorporates herein by reference Japanese Patent Application No. 2004-241149 filed on Aug. 20, 2004.

FIELD OF THE INVENTION

The present invention relates to an inter-device communication system that may be used in a wiper control apparatus that includes a communication system for performing communication between a wiper driving device for wiping windshield glass of a vehicle to remove raindrops on the windshield glass by an operation of a wiper and a rain detection device for detecting raindrops, for example.

BACKGROUND OF THE INVENTION

A conventional wiper control apparatus includes a rain detection device for detecting raindrops on a windshield glass in order to automatically control a wiper in accordance with a state of rainfall. It also includes a wiper driving device having a controller to which an external signal such as a signal of a wiper switch is input (for instance JP-A-2001-99948).

In this wiper control apparatus, the rain detection device includes a pair of a light-emitting element and a light-receiving element for optically detecting raindrops on the windshield glass. The rain detection device also includes a control circuit that makes the light-emitting element emit light when the raindrops are to be detected. The control circuit selects a wiping speed or a wiping mode of the wiper in accordance with the detected amount of raindrops and outputs a wiper driving signal in accordance with the selected wiping speed or wiping mode to the controller in the wiper driving device. Moreover, vehicle information such as a switching signal of the wiper switch for determining whether to perform rain detection or not and a driving position signal for the wiper, is input to the controller. This vehicle information is output from the wiper driving device to the rain detection device.

The control circuit in the rain detection device and the controller in the wiper driving device are provided with respective communication circuits for bidirectional communication.

In order for the rain detection device to detect the amount of raindrops, it is necessary to send the vehicle information such as the driving position signal for the wiper to the rain detection device. The sending of the vehicle information is performed by the communication circuit of the controller of the wiper driving device. On the other hand, it is necessary to send the wiper driving signal from the rain detection device to the wiper driving device. The sending of the wiper driving signal is performed by the communication circuit of the control circuit of the rain detection device. Thus, a plurality of communication lines is usually connected between the communication circuits of the control circuit and the controller for bidirectional communication, thus making the communication system complicated.

SUMMARY OF THE INVENTION

It is therefore an object of the present invention to simplify a communication system performing communication between a rain detection device and a wiper driving device in a wiper control apparatus.

According to the present invention, an inter-device communication system is for a wiper control apparatus that includes a rain detection device and a wiper driving device. The system includes communication circuits having a transmission line for unidirectionally sending a rain detection signal to the wiper driving device. The system includes a transmission circuit arranged in the wiper driving device for short-circuiting a potential of the signal unidirectionally sent through the transmission line. The system further includes a recognition circuit arranged in the rain detection device for recognizing transmitting information sent in an opposite direction to a direction of the unidirectional transmission, i.e., from the wiper driving device to the rain detection device based on the short-circuited signal.

BRIEF DESCRIPTION OF THE DRAWINGS

The above and other objects, features and advantages of the present invention will become more apparent from the following detailed description made with reference to the accompanying drawings. In the drawings:

FIG. 5 is a timing diagram of exemplary unidirectional communication between the wiper driving device and the rain detection device shown in FIG. 2.

DETAILED DESCRIPTION OF THE PREFERRED EMBODIMENT

Figure 1:
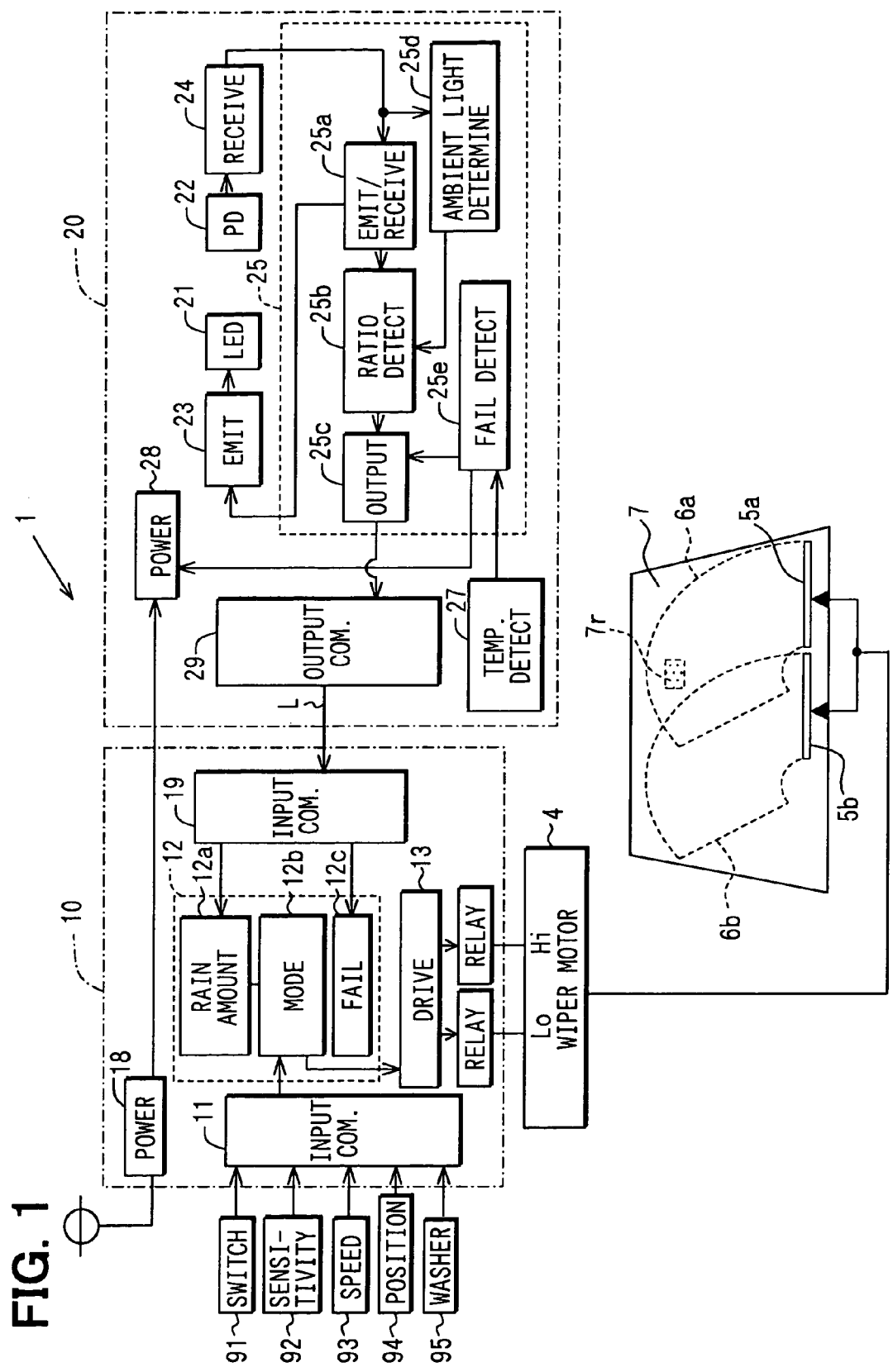
FIG. 1 is a block diagram of an inter-device communication system according to an embodiment of the present invention.

Referring to FIG. 1, a wiper control apparatus 1 provided as an inter-device communication system, includes a wiper driving device 10 and a rain detection device 20. The rain detection device 20 detects raindrops adhering to windshield glass 7 such as a front windshield. The windshield 7 may alternatively be a rear windshield. The wiper driving device 10 drives wipers 5a and 5b arranged on the windshield 7 when raindrops are present on the windshield 7. The wipers 5a and 5b include wiper blades on a driver side and a passenger side that are arranged to wipe a surface of the windshield 7. The wipers 5a and 5b are driven by a driving force of a wiper motor 4 through a known link mechanism. An in-car power supply such as a battery supplies a power to the wiper driving device 10 and the rain detection device 20 through power supply circuits 18 and 28, respectively.

The wiper driving device 10 includes input circuits 11 and 19, a first control circuit 12, and a driving circuit 13. The input circuits 11 and 19 are arranged to serve as an external signal input circuit 11 and an input-side communication circuit 19, respectively. To the external signal input circuit 11, external signals such as vehicle information, e.g., a switching signal of a wiper switch (not shown) are input. The input-side communication circuit 19 serves as a communication circuit to which an output signal (a rain amount detection signal) of the rain detection device 20 is input. The external signal input circuit 11 is a known input device including an A/D converter, an I/O port and the like.

The external signals are input to the external signal input circuit 11. Here, the external signals include, for example, a switching signal 91 and a sensitivity signal 92 of a wiper switch, a signal 93 indicating a car speed that represents a travel state of a vehicle (speed signal), a driving position signal 94 of the wiper motor 4 for driving the wipers 5a and 5b (S/M signal), and a signal 95 of a window washer switch (not shown) (window washer operating signal). Those external signals are subjected to A/D conversion that converts an analog signal to a digital signal, for example, and are then output to the first control circuit 12.

The wiper switch has a function of switching modes, i.e., a mode in which the wiping operation of the wipers 5a and 5b is stopped (OFF mode), a mode in which the wiping operation is automatically controlled (AUTO mode), a mode in which the wiping is carried out at a low speed (LO mode), and a mode in which the wiping is carried out at a high speed (HI mode) by a manual operation by a driver or the like. The wiper switch is rotated to any of four operating positions, for example, thereby outputting a switching signal for selecting one of the above four modes to the external signal input circuit 11.

The wiper switch also has a function of switching the sensitivity of the rain detection device 20 from one of an operating sensitivity MAX (maximum), an operating sensitivity M1, an operating sensitivity M2, and an operating sensitivity MIN (minimum) to another, for example, by a manual operation by the driver or the like. Those operation sensitivities MAX, M1, M2, and MIN are sensitivity switching information for setting the sensitivity of the rain detection device 20 that depends on the responsiveness of the wiping operation, i.e., the amount of raindrops to be in a range of a predetermined level, and can be switched in accordance with the driver's preference. The wiper switch outputs the sensitivity signal corresponding to any of the above four operating sensitivities to the external signal input circuit 11 by switching a variable resistor value (VR resistor value) in the wiper switch. The window washer switch has a function of issuing an instruction to spray droplets for cleaning the windshield 7 toward the windshield 7 in the case where the driver feels that the view is obscured by dirt on the windshield 7 or the like. When the window washer switch is turned on, the window washer operating signal is output.

The first control circuit 12 is a microcomputer which has a known structure, and is formed to have a function of a CPU for performing a control process and arithmetic processing, a function of a storage device including a memory for storing various types of programs and data, such as a read-only memory (ROM) or a memory (RAM) into which data writing can be performed, and the like. Main functions of the first control circuit 12 that are achieved by running the programs stored in the memory are represented as logic circuits. That is, the first control circuit 12 includes a rain amount detection circuit 12a, a wiping mode selection circuit 12b, and a failure determination circuit 12c. The rain amount detection circuit 12a receives the amount of adhering raindrops that is detected by the rain detection device 20 (more specifically, a rain detection signal) through the input-side communication circuit 19 for every wiping period of the wipers 5a and 5b, and calculates the amount of adhering raindrops from the rain detection signal.

More specifically, the calculation of the amount of adhering raindrops is performed as follows. The amount of adhering raindrops is stored in the memory (RAM) in an order of wiping periods. Then, an averaging operation such as an operation for obtaining moving average deviation is performed, thereby obtaining an average of the amount of adhering raindrops. The calculation of the amount of adhering raindrops may obtain the amount of adhering raindrops for every wiping period, instead of the average of the amount of adhering raindrops. In the following description, it is assumed that the calculation of the amount of raindrops in the present embodiment obtains the average of the amount of adhering raindrops.

The wiping mode selection circuit 12b selects the wiping mode of the wipers 5a and 5b based on the calculated amount of raindrops. Instead of the wiping mode, a wiping speed or an interval time may be selected. The interval time of the wiping operation of the wiper is a time from completion of the wiping of the windshield 7 by the wipers 5a and 5b until start of the next wiping. More specifically, the wiping mode selection circuit 12b selects the wiping mode based on vehicle information such as the switching signal input through the external signal input circuit 11 and the amount of raindrops, thereby performing automatic control of the wiping operation of the wipers 5a and 5b in an appropriate manner. For example, in the case where the vehicle information indicates that the wiper switch is set to select the AUTO mode by a driver's operation, the switching signal corresponding to the AUTO mode is input to the first control circuit 12 through the external signal input circuit 11. Therefore, the wiping mode of the wiper is selected by the wiping mode selection circuit 12b. The wiping mode selection circuit 12b outputs a driving signal corresponding to the selected wiping mode to the driving circuit 13.

The failure determination circuit 12c determines whether or not an input time of the rain detection signal from the rain detection device 20 or the like is in a predetermined detection period, for example. In the case where the input time is in the predetermined detection period, execution of a determination logic for selecting the wiping mode by the wiping mode selection circuit 12b is stopped. In the case where the input time is outside the predetermined detection period, i.e., the predetermined detection period terminates, that determination logic is executed.

The first control circuit 12 also has a function of estimating time (wiper passing time) t2 at which the wipers 5a and 5b pass through the rain detection device 10, more specifically a detection target portion 7r shown in FIG. 1 or a predetermined period T2 (from time t1 to time t3) containing the wiper passing time based on the S/M signal 94 (FIG. 5). The S/M signal 94 is a motor position signal representing a driving position of the wiper motor 4, as shown in FIG. 5, for example. The S/M signal 94 indicates that the motor is operating (is turned on) from time t0 to time t4 and is stopped from the time t4 to time t5 (is turned off).

It is noted that the wiping speed of the wipers is not always the same even when the same wiping mode is selected. This is because friction resistor between the wipers 5a and 5b (more specifically, the wiper blades) and the windshield 7 is affected by an adhering state of raindrops to the windshield 7. Therefore, in case of estimating the wiper passing time t2, it is preferable to specify a predetermined period T2 (e.g., 200 ms) that contains not only the wiper passing time t2 but also the times t1 and t3 around the wiper passing time t2. In this case, it is possible to surely identify the wiper passing time t2. The first control circuit 12 outputs a signal to a base terminal of a second switch 19a through a port 12o (FIG. 2), during the predetermined period T2.

The first control circuit 12 forms determination means for estimating the wiper passing timing t2 at which the wipers 5a and 5b pass through the rain detection device 10, more specifically the detection target portion 7r, or the predetermined period T2 containing the wiper passing timing based on the S/M signal 94. The predetermined period T2 is from the termination time of a detection period T1 suitable for rain detection (immediately after the detection period T1). Thus, the first control circuit 12 determines the detection period T1 suitable for rain detection based on the S/M signal 94 and a position of the detection target portion 7r. The predetermined period T2 is a period in which no rain detection is performed.

The rain detection device 20 includes a light-emitting element (LED) 21, a light-receiving photo diode (PD) 22, a light-emitting circuit 23, a light-receiving circuit 24, a second control circuit 25, a temperature detection circuit 27, and an output-side communication circuit 29. The LED 21 is a light-emitting diode and is driven by the light-emitting circuit 23. A signal that is output from the PD 22 receiving light emitted from the light-emitting diode is detected and amplified by the light-receiving circuit 24. Thus, the light amount detected by the PD 23 is converted into a voltage and is then output to the second control circuit 25 as a voltage signal.

One pair of the LED 21 and the PD 22 is shown in FIG. 1. This pair is arranged within a wiping region 6a. However, a plurality of pairs may be provided. When a plurality of pairs of the LED 21 and the PD 22 are arranged within regions 6a and 6b on the windshield 7 that can be wiped by the wipers 5a and 5b, the detection precision of the amount of raindrops adhering to the windshield 7 (the amount of adhering raindrops) can be improved.

The LED 21 emits light toward an object of rain detection (i.e., the windshield 7, more specifically the detection target portion 7r of the windshield 7 in which the LED 21 and the PD 22 are arranged). The PD 22 receives the light that is emitted from the LED 21 and is then reflected from the windshield 7. The PD 22 outputs a rain detection signal having an output value that is approximately in proportion to the amount of the received light, for example, through the light-receiving circuit 24.

More specifically, in the case (dry state) where there is no raindrop on the outer surface of the windshield 7, approximately all part of light incident on the windshield 7 is reflected by total reflection and is received by the PD 22. The amount of the received light in this state is referred to as the maximum amount of the received light. In the case where there are raindrops on the outer surface of the windshield 7, the raindrops obstruct total reflection and reduce the amount of the light received by the PD 22 in accordance with the amount of raindrops. That is, the output value of the rain detection signal is reduced in accordance with the amount of raindrops, as compared with the rain detection signal obtained from the maximum amount of the received light in the dry state (rain sensor MAX value). The reduction amount of the output value of the rain detection signal with respect to the rain sensor MAX value represents the amount of adhering raindrops, and a ratio of the reduction to the rain sensor MAX value represents a ratio of adhering raindrops.

The signal that is sent from the rain detection device 20 to the wiper driving device 10 through the output-side communication circuit 29 and the input-side communication circuit 19 is not limited to the rain detection signal itself. Alternatively, the rain detection device 20 may send the ratio of adhering raindrops obtained by performing arithmetic processing for the rain detection signal. In case of estimating the amount of adhering raindrops by using the ratio of adhering raindrops, it is easy to convert an analog signal from the PD 22 that has a value in accordance with the amount of the received light into a digital signal representing the ratio of adhering raindrops. Thus, the control process performed in the second control circuit 25 or the first control circuit 12 can be made more efficient. In the following description, it is assumed that the rain detection signal of the rain detection device 20, that is sent to the wiper driving device 10, is the ratio of adhering raindrops for which arithmetic processing is performed.

The second control circuit 25 is a microcomputer which has a known structure, and is formed to have a function of a CPU for performing a control process and arithmetic processing, a function of a storage device including a memory for storing various types of programs and data, such as a read only memory (ROM) or a random access memory (RAM) into which data writing can be performed, and the like. Main functions of the second control circuit 25 are represented as a light receiving and emission control circuit 25a, an adhering rain ratio detection circuit 25b, a rain detection signal output circuit 25c, an ambient light determination circuit 25d, and a failure determination circuit 25e. The light receiving and emission control circuit 25a controls a driving current for making the LED 21 emit light through the light-emitting circuit 23 and controls time of light emission. The light receiving and emission control circuit 25a also controls an amplifying operation of the light-receiving circuit 24 to be approximately in synchronization with the output from the LED 21. Thus, the PD 22 is prevented from receiving light other than the light output from the LED 21.

The adhering rain ratio detection circuit 25b calculates the ratio of adhering raindrops based on the rain detection signal in accordance with the amount of the received light from the PD 22. The rain detection signal output circuit 25c outputs the thus calculated ratio of adhering raindrops to the wiper driving circuit 10, more specifically the input-side communication circuit 19, through the output-side communication circuit 29. The ambient light determination circuit 25d determines whether or not the light received by the PD 22 is output in a predetermined detection period. When the light received by the PD 22 is output in the predetermined detection period, the adhering rain ratio detection circuit 25b is operated. When the light received by the PD 22 is not output in the predetermined period, the operation of the adhering rain ratio detection circuit 25b is stopped.

The failure determination circuit 25e determines whether or not a temperature of a prism (not shown) is a predetermined temperature. The prism is arranged between the LED 21, the PD 22 and the windshield 7, for refracting light from the LED 21 in such a manner that the light emitted from the LED 21 toward the windshield 7 is surely incident on the PD 22. The temperature of the prism is detected by a temperature sensor (not shown) of the temperature detection circuit 27. When the detected temperature is equal to or lower than the predetermined temperature, the failure determination circuit 25e stops output of the rain detection signal from the output circuit 25c in order to prevent dewdrops that may be present on the prism from being erroneously determined as raindrops. In the case where a heater driving circuit (not shown) is provided for heating the prism, instead of stopping the output of the rain detection signal from the output circuit 25c, the temperature of the prism may be controlled to be kept at a dew point or higher by sending a heater control signal so that the heater control circuit heats a heater (not shown).

The input-side communication circuit 19 and the output-side communication circuit 29 form a communication circuit for performing communication between the wiper driving device 10 and the rain detection device 20. The input-side communication circuit 19 and the output-side communication circuit 29 are connected by a transmission line L.

Figure 2:
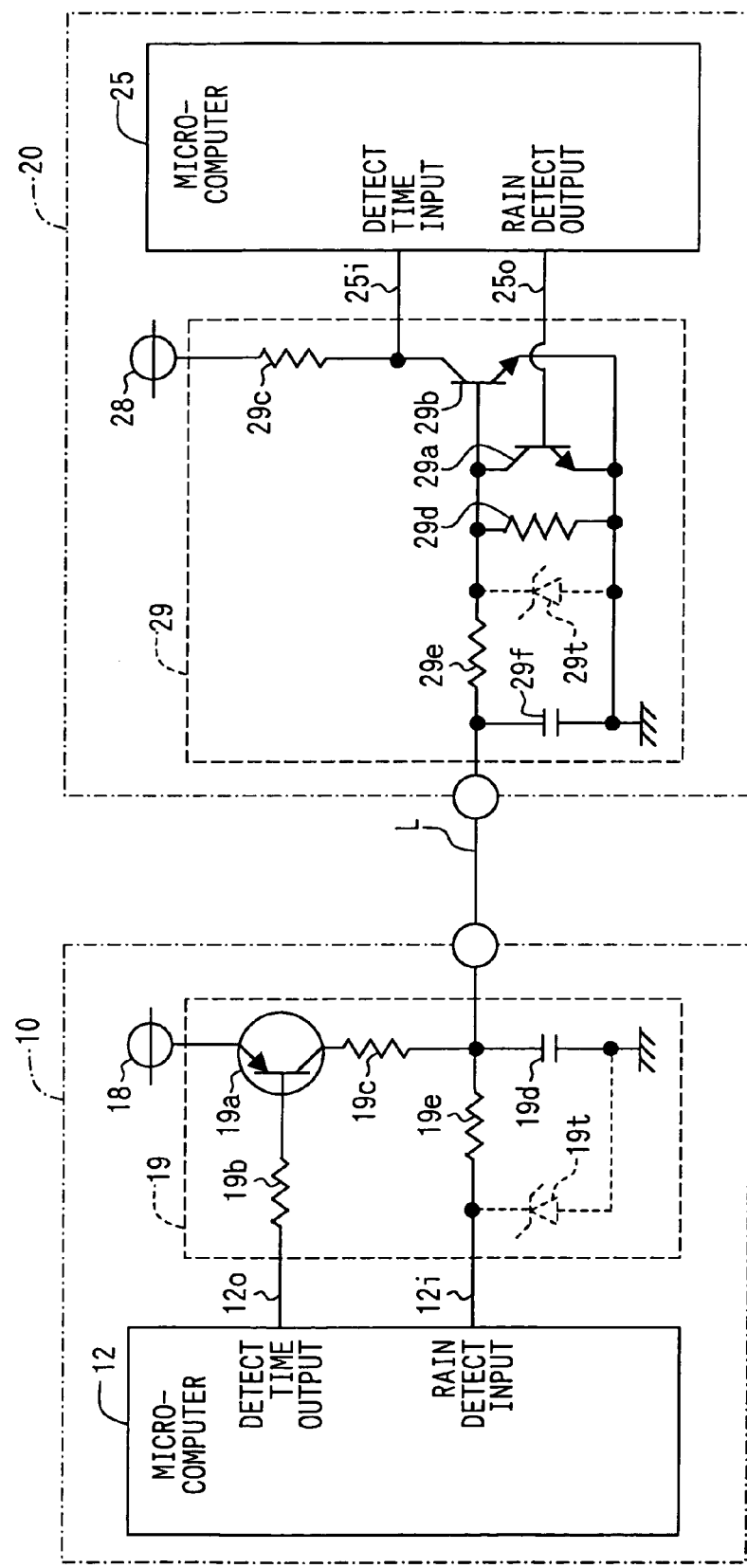
FIG. 2 is a detailed circuit diagram of the inter-device communication system shown in FIG. 1.

The communication system between the wiper driving device 10 and the rain detection device 20, i.e., the input-side communication circuit 19 and the output-side communication circuit 29 are shown in detail in FIG. 2. The input-side communication circuit 19 includes a switching element (first switch) 19a that is opened (turned off) and closed (turned on) based on an external signal and a dielectric element (capacitor) 19d. An emitter terminal of the first switch 19a is connected to a power supply 18 and a collector terminal is connected to one end of the capacitor 19d through a load resistor 19c in series. The other end of the capacitor 19d is grounded electrically.

The first switch 19a and the capacitor 19d form a transmission circuit for short-circuiting a potential of a signal that is unidirectionally sent through the transmission line L.

The transmission line L is connected to a middle point between the load resistor 19c and the capacitor 19d. The transmission line L is connected to a port 12i through a load resistor 19e. To the port 12i, the rain detection signal of the first control circuit 12 is input. A base terminal of the first switch 19a is connected to a port 12o that can send vehicle information that is related to the external signals of the first control circuit 12. In the case where a predetermined time T2 is estimated based on input of a S/M signal 94, the first control circuit 12 outputs a signal having duration in accordance with the predetermined period T2 to the base terminal of the second switch 19a through the port 12o to be in synchronization with a predetermined period (i.e., the predetermined period T2 shown in FIG. 5). During the predetermined period T2, the first switch 19a is opened. During a period other than the predetermined period (i.e., during the detection period T1 shown in FIG. 5), the first switch 19a is closed because no signal is output from the first control circuit 12 to the base terminal of the first switch 19a through the port 12o.

The output-side communication circuit 29 includes a second switch 29a, a third switch 29b, load resistors 29c, 29d and 29e, and a smoothing capacitor 29f. A base terminal of the second switch 29a is connected to a port 25o through which the rain detection signal of the second control circuit is output. A collector terminal of the second switch 29a is connected to a base terminal of the third switch 29b. The collector terminal of the second switch 29a and the base terminal of the third switch 29b are connected to the transmission line L through the load resistor 29e. One end of the load resistor is connected to a middle point between the collector terminal of the second switch 29a and the load resistor 29e. One end of the capacitor 29f is connected to an end of the load resistor 29e that is opposite to an end closer to the above middle point. An emitter terminal of the second switch 29a, an emitter terminal of the third switch 29b, the other end of the load resistor 29d, and the other end of the capacitor 29f are electrically grounded.

A collector terminal of the third switch 29b is connected to a power supply, more specifically a power supply circuit 28, through the load resistor 29c. A port 25i for receiving time of rain detection by the second control circuit is connected to a middle point between the collector terminal of the third switch 29b and the load resistor 20c. In the case where a signal output to the input-side communication circuit 19 through the transmission line L is supplied to the base terminal of the third switch 29b, the third switch 29b is closed. In the case where that signal is not supplied to the base terminal of the third switch 29b, the third switch 29b is opened. The second control circuit 25 detects that the third switch 29b is opened through the port 25i. In the case where the opening state of the third switch 29b is caused by the predetermined period T2, the second control circuit 25 updates the rain detection signal to a reference value indicating the dry state (the rain sensor MAX value) as shown in (b) in FIG. 5.

The second switch 29a forms a switching element for outputting the rain detection signal to the transmission line L. The third switch 29b and the port 25i form a recognition circuit for recognizing the predetermined period T2 as transmitting information that is transmitted in an opposite direction to a direction of the above unidirectional communication, i.e., from the input-side communication circuit 19 to the output-side communication circuit 29 based on the short-circuited signal. The port 25i forms a receiving circuit for detecting whether the third switch 29b is opened or closed.

In the case where the rain detection signal is output to the base terminal of the second switch 29a through the port 25o, the output-side communication circuit 29 outputs a duty signal as a signal output to the input-side communication circuit 19 through the transmission line L. The rain detection signal in accordance with the ratio of adhering raindrops is output to the base terminal of the switch 29a through the port 25o. The output-side communication circuit 29 outputs the duty signal having a duty ratio in accordance with the ratio of adhering raindrops.

The output-side communication circuit 29 and the second control circuit 25 (more specifically, the port 25o) form rain detection signal output means for outputting the rain detection signal in accordance with the amount of raindrops, more specifically the ratio of adhering raindrops. The output-side communication circuit 29 forms output means for outputting the duty signal having the duty ratio in accordance with the ratio of adhering raindrops The input-side communication circuit 19 and the output-side communication circuit 29 form a communication system having the transmission line L for transmitting a unidirectional signal to one device to the other device through the transmission line L.

An operation of the communication system for performing communication in the wiper control apparatus 1 of the present embodiment, especially between the wiper driving device 10 and the rain detection device 20 is now described with reference to FIGS. 3, 4, and 5. In FIG. 5, (a) to (c) show an operation of the rain detection device 20, while (d) to (f) show an operation of the wiper driving device 10. In FIG. 5, (a) to (f) respectively show a waveform indicating a detection period T1 and a predetermined period T2 as a non-detection period, a waveform of a rain detection signal at the port 25o, an output waveform of a duty signal on the transmission line L, a waveform showing a determination time at which the wiping mode is determined, a waveform of voltage characteristics supplied to the wiper motor, and a waveform representing a driving position signal of the wiper motor 4.

Figure 3:
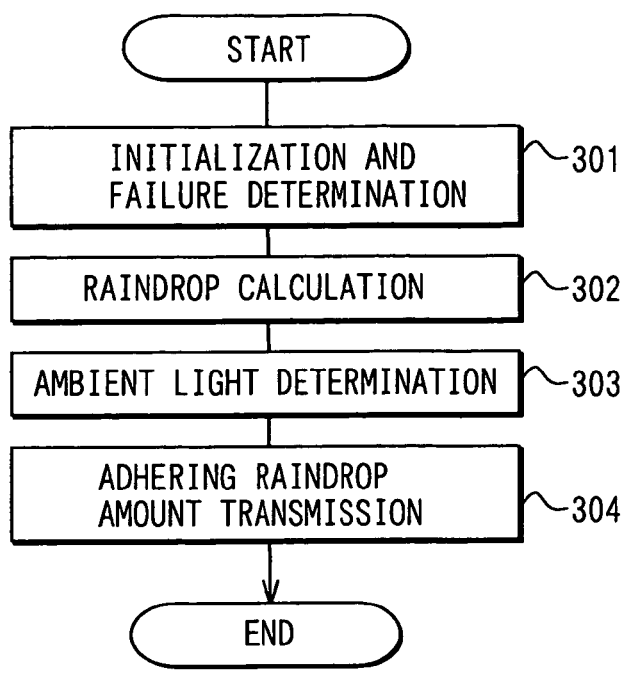
FIG. 3 is a flowchart of a control process for detecting raindrops performed by a rain detection device in the inter-device communication system shown in FIG. 1.

As shown in FIG. 3, the second control circuit 25 of the rain detection device 20 initializes data or the like in step (S) 301. Moreover, the second control circuit 25 detects the temperature of the prism. In the case where the detected temperature is equal to or lower than a predetermined temperature, it performs failure determination in order to prevent dewdrops that may be present on the prism from being erroneously determined as raindrops. For example, the second control circuit 25 stops output of the rain detection signal from the output circuit 25c, as the failure determination.

It is necessary for the rain detection device 20 to perform rain detection in the detection period T1 that is suitable for rain detection for every wiping period of the wipers 5a and 5b. Therefore, the rain detection device 20 has to recognize the detection period T1 or the predetermined period T2 as the non-detection period, as information from the outside. The rain detection device 10 recognizes the predetermined period T2 that is the information from the outside, for example, as transmitting information from the wiper driving device 10 by the communication system, more specifically the input-side communication circuit 19 and the output-side communication circuit 29, without sending a signal from the wiper driving device 10 to the rain detection device 10.

More specifically, as shown in (c) of FIG. 5, the duty signal that is unidirectionally sent from the output-side communication circuit 29 to the input-side communication circuit 19 is short-circuited by the transmission circuit of the input-side communication circuit 19, more specifically the first switch 19a and the capacitor 19d, temporarily, more specifically during the predetermined period T2, so as to set its potential to a zero level. When the potential of the duty signal is placed at the zero level during the predetermined period T2, the third switch 29b of the output-side communication circuit 29 is opened. The second control circuit 25 can synchronously recognize the predetermined period T by detecting that the third switch 29b is switched to be opened through the receiving circuit, more specifically the port 25i, even if signal transmission to the rain detection device 20 is not performed by a transmission line other than the transmission line L.

The second control circuit 25 detects the amount of raindrops adhering to the detection target portion 7r of the windshield 7 for every wiping period in S302. More specifically, the second control circuit 25 can obtain the reduction amount ((b) in FIG. 5) from a difference between the rain sensor MAX value that is the amount of light received by the PD 22 in the dry state and the amount of light received by the PD 22 when raindrops are present on the detection target portion 7r, and can calculate the amount of raindrops from the thus obtained reduction amount. In the wiping period, the second control circuit 25 updates the rain detection signal to a reference value, i.e., the rain sensor MAX value in the predetermined value T2. Moreover, the second control circuit 25 recognizes the predetermined period T2 (e.g., 200 ms). Therefore, the second control circuit 25 can determine a time such as a start time (time t3) of the detection period T1 in the next wiping operation. In addition, by updating the rain detection signal to the reference value, i.e., the rain sensor MAX value within the predetermined period T2, the update of the rain detection signal can be performed immediately after the wiper passing time t2.

In S303, the amount of ambient disturbance light other than the light output from the LED 21 within a predetermined detection period (i.e., the amount of ambient light) is determined from the light received by the PD 22. Then, a threshold value for the change amount of the light received by the PD 22, which is used for determination of raindrops, is changed in order to prevent erroneous determination caused by change of the amount of ambient light.

In S304, the second control circuit 25 unidirectionally transmits a reduction ratio of the output value of the rain detection signal with respect to the reference value thereof, more specifically the rain sensor MAX value, as the duty signal through the output-side communication circuit 29 because the reduction ratio represents the amount of adhering raindrops. The output-side communication circuit 29 outputs the duty signal having a duty ratio in accordance with the ratio of adhering raindrops to the input-side communication circuit 19.

Figure 4:
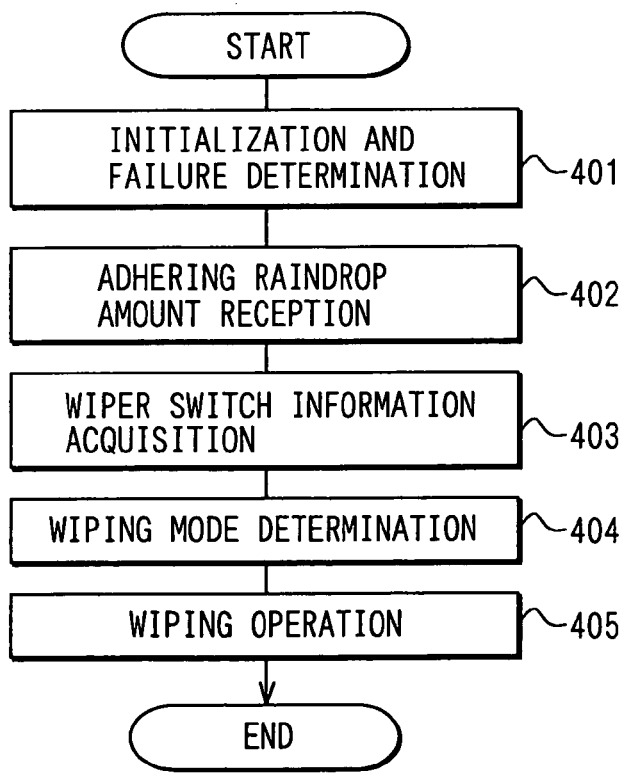
FIG. 4 is a flowchart of a control process for determining a wiping mode of a wiper performed by a wiper driving device in the inter-device communication system shown in FIG. 1.

As shown in FIG. 4, the first control circuit 12 of the wiper driving device 10 initializes data or the like in S401. The first control circuit 12 also performs failure determination, i.e., determines whether or not the duty signal received by the input-side communication circuit 19 is output in the non-detection period (i.e., the predetermined period T2), for example. In the case where the received duty signal is output in the predetermined period T2, the first control circuit 12 waits until a start time of the detection period T1 of a next wiping period. In the case where the received duty signal is output in a period other than the predetermined period T2, i.e., the predetermined period T2 terminates, the first control circuit 12 performs S402.

In S402, the first control circuit 12 converts the received duty signal into a ratio of adhering raindrops or the amount of adhering raindrops and figures out a state of rainfall from the ratio of adhering raindrops or the amount of adhering raindrops. The amount of adhering raindrops that is measured in a detection area of the detection target portion 7r is easily varied with respect to the actual amount of raindrops in that state of rainfall. Thus, for example, it is preferable to calculate an average of the ratio of adhering raindrops or an average of the amount of adhering raindrops obtained by an operation for obtaining moving averaging deviation or the like for a plurality of wiping periods, instead of the ratio of adhering raindrops or the amount of adhering raindrops in one wiping period.

In S403, the first control circuit 12 acquires vehicle information, such as a switching signal 91 of the wiper switch. In the case where the switching signal 91 indicates an AUTO mode, it is determined that the wiping by the wipers 5a and 5b is automatically controlled by the wiper control apparatus 1. Thus, the control process of the first control circuit 12 moves to S404. In the case where the switching signal 91 indicates a mode other than the AUTO mode, such as an LO mode, the first control circuit 12 waits until the switching signal 91 is switched to indicate the AUTO mode by a driver's operation.

The vehicle information is not limited to the switching signal 91. Signals such as a sensitivity signal 92, a speed signal 93 and an S/M signal 94 may be read as the vehicle information. Those signals are used for selecting mode-up or mode-down of the wiping mode based on the ratio of adhering raindrops or the amount of adhering raindrops, more specifically the average of the ratio of adhering raindrops or the average of the amount of adhering raindrops, for example.

In S404, the first control circuit 12 determines the most appropriate wiping mode of the wipers 5a and 5b in accordance with the amount of raindrops, when the detection period T1 terminates, i.e., the predetermined period 12 is detected. More specifically, the first control circuit 12 determines the most appropriate wiping mode based on the ratio of adhering raindrops or the amount of adhering raindrops that is detected in S402, more specifically the average of the ratio of adhering raindrops or the average of the amount of adhering raindrops. Then the first control circuit 12 determines that mode-up or mode-down is to be performed for the currently selected wiping mode or the currently selected wiping mode is to be kept. As a reference of the determination of the wiping mode, a plurality of threshold values, the number of which corresponds to the number of wiping modes, are set in case of using the amount of adhering raindrops, or a plurality of threshold values indicating a plurality of ratios, the number of which corresponds to the number of wiping modes, are set in case of using the ratio of adhering raindrops.

In S405, the first control circuit 12 outputs a driving signal in accordance with the wiping mode determined in S404 to the driving circuit 13. The driving circuit 13 drives the wipers 5a and 5b to perform a wiping operation (more specifically, a wiping operation at a wiping speed or at an interval) corresponding to the wiping mode determined by the first control circuit 12. In this manner, the control process is terminated.

The above embodiment has the following advantages.

(1) The communication system between the rain detection device 20 and the wiper driving device 10 is formed by a single transmission line L for unidirectionally sending a signal from the rain detection device 20 to the wiper driving device 10. Thus, it is not necessary to provide a plurality of transmission lines for bidirectional signal transmission. This can simplify the communication system.

(2) In the present embodiment, the transmission circuit for short-circuiting a potential of the signal unidirectionally sent through the transmission line L, more specifically the first switch 19a and the capacitor 19d, is provided on the wiper driving device 10, i.e., a receiving side of the unidirectional transmission. Furthermore, the recognition circuit for recognizing transmitting information that enables transmission of information from the receiving side device of the unidirectional transmission to a sending side device based on the short-circuited signal, more specifically the third switch 29b and the 25i, is provided in the rain detection device 20, i.e., the sending side. Thus, even if the communication system is formed by one transmission line L for unidirectionally sending a signal, because the transmission circuit for short-circuiting the unidirectional signal is provided in the wiper driving device 10 that is the receiving side of the unidirectional sending, information can be transmitted from the receiving side of the unidirectional sending to the sending side device based on a status of the unidirectional short-circuited signal due to the recognition circuit provided on the rain detection device 20 side that is the sending side of the unidirectional sending.

(3) The first switch 19a and the capacitor 19d that is connected to the first switch 19a at one end and is grounded at the other end are provided as the transmission circuit for short-circuiting the potential of the unidirectionally sent signal. The transmission line L is connected to a point between the first switch 19a and the capacitor 19d. Thus, the transmission circuit that can perform sending of a signal from the receiving side device of the unidirectional signal to the sending side device can be formed by a relatively simple structure.

(4) As the recognition circuit for transmitting information in an opposite direction to a direction of the unidirectional signal sending, i.e., from the receiving side device of the unidirectional signal to the sending side device, which recognizes the transmitting information based on the short-circuited unidirectional signal, the third switch 29b and receiving circuit, more specifically, the port 25i, are provided. The third switch 29b is connected to the transmission line L together with the second switch 29a that is one part of the communication system provided in the rain detection device 20, and can be opened and closed in accordance with opening and closing of the second switch 29a. The receiving circuit detects whether the third switch 29b is opened or closed. Thus, the recognition circuit, provided in the communication system on the sending device side, for recognizing the transmitting information in order to unidirectionally transmit information in the opposite direction, i.e., from the receiving side to the sending side can be formed by a relatively simple structure.

(5) The wiper driving device 10 as the receiving side device of the unidirectional signal sending includes the first control circuit 12 and the input-side communication circuit 19. The first control circuit 12 has a determination function of estimating a wiper passing time t2 at which wipers 5a and 5b pass through the rain detection device 10 (more specifically, the detection target portion 7r) or a predetermined period T2 containing the wiper passing time based on the S/M signal that is related to a wiping operation by the wipers 5a and 5b. Since the predetermined period T2 is a period from a termination time of a detection period T1 that is suitable for rain detection (i.e., immediately after the detection period T1), the first control circuit 12 has a determination function for determining the detection period T1 suitable for rain detection based on the S/M signal 94 and the position of the detection target portion 7r.

In the case where the rain detection device 20 detects the amount of raindrops present on the windshield 7 and unidirectionally sends the detected amount of raindrops to the wiper driving device 10 through the transmission line L, the rain detection device 20 has to perform the detection within the detection period T1 suitable for rain detection, by using information from a device other than the rain detection device 20 or from the outside.

Thus, the first control circuit 12 of the wiper driving device has the determination function for determining the detection period T1 suitable for rain detection based on the S/M signal that is related to a wiper's position in the wiping period of the wipers 5a and 5b, such as a stop position of the wipers 5a and 5b, and the position of the rain detection device 10. Moreover, the transmission circuit provided in the wiper driving device 10 side that is the receiving side of the unidirectional signal short-circuits the potential of the unidirectional signal for a predetermined period from the termination time of the detection period T1 that is determined by that determination circuit. Therefore, it is possible to transmit the detection period T1 suitable for rain detection or the predetermined period T2 that is not suitable for rain detection to the rain detection device via the recognition means in the opposite direction to a direction of the unidirectional signal transmission.

(6) In the case where the rain detection device 20 is arranged on the detection target portion 7r in a wiping region of the wipers 5a and 5b on the windshield 7, the wipers 5a and 5b collect raindrops present on the windshield 7 when wiping the windshield 7 to remove the raindrops on the windshield 7. Thus, if rain detection is performed at a time when the wipers 5a and 5b pass through the rain detection device 20, the rain detection device 20 may erroneously detect that there is more rain than the actual rainfall.

In order to prevent the above, the wipers 5a and 5b pass through the rain detection device 20 along the windshield 7 in the predetermined period T2 other than the detection period T1 suitable for rain detection in the present embodiment. Thus, the rain detection device 20 that is the sending side of the unidirectional communication can recognize the aforementioned predetermined period T2 as the transmitting information from the transmission circuit of the wiper driving device 10 as the receiving side of the unidirectional communication, and can prevent erroneous detection.

(7) In the case where the rain detection device 20 is the sending side device of the unidirectional communication, it is preferable that rain amount signal output means for outputting the signal in accordance with the amount of raindrops output a duty signal as the unidirectional signal. In this case, the magnitude of the signal in accordance with the amount of raindrops can be precisely represented by the duty signal having a duty ratio as a digital signal. Since that duty signal is unidirectionally sent to the wiper driving device 10, information indicating how large the amount of raindrops is can be always transmitted to the wiper driving device 10 precisely.

(8) It is preferable that the rain detection device 20 be provided with a calibration circuit or calibrating the potential of the signal in accordance with the amount of raindrops to a predetermined potential, i.e., a rain sensor MAX value within the predetermined period T2, i.e., immediately before a start time of the detection period T1 suitable for rain detection. Thus, in the case where the rain detection device 20 is the sending side device of the unidirectional communication, the rain detection device 20 can recognize the predetermined period T2 from the termination time of the detection period T1 via the recognition means due to the transmission circuit of the wiper driving device 10 that is the receiving side device. Therefore, the calibration circuit can easily calibrate the potential of the rain detection signal to the rain sensor MAX value within the predetermined period T2, i.e., immediately before the detection period T1.

In the embodiment, the transmission circuit for short-circuiting the unidirectional signal flowing through the transmission line L is formed by the first switch 19*a*, the capacitor 19*d* and the power supply circuit 18 for supplying currents to those elements. Moreover, a Zener diode 19*t* may be provided for preventing application of an over-voltage in each of the wiper driving device 10 and the rain detection device 20. More specifically, a Zener diode 19*t* (shown with broken line in FIG. 2) that is grounded is connected between the port 12*i* and the load resistor 19*e* in order to prevent application of the over-voltage to the port 12*i* of the first control circuit 12. Further, a Zener diode 29*t* (shown with broken line in FIG. 2) that is grounded is connected between the load resistors 29*d* and 29*e*, for example, in order to prevent application of over-voltage to the second switch 29*a*, the third switch 29*b* or the capacitor 29*f* in the output-side communication circuit 29. In this case, an inexpensive electronic element that can be tolerant to a relatively low voltage can be used as a switching element or a dielectric element used in the first control circuit 12 and the output-side communication circuit 29, such as the second switch 29*a* or the capacitor 29*f*.

In the embodiment, the rain detection device 20 and the wiper driving device 10 are the sending device and the receiving device of the unidirectional signal, respectively. However, the rain detection device 20 and the wiper driving device 10 may be the receiving device and the sending device of the unidirectional signal, respectively.

What is claimed is:

1. An inter-device communication system for a wiper control apparatus that includes a wiper driving device for operating a wiper and a rain detection device and controls an operation of the wiper for removing raindrops on a windshield glass by the wiper driving device in accordance with an amount of raindrops detected by the rain detection device, the inter-device communication system comprising:

a communication means having a single transmission line for unidirectionally sending a signal to one of the wiper driving device and the rain detection device;

a transmission means, arranged in the one of the wiper driving device and the rain detection device, for short-circuiting a potential of the signal unidirectionally sent through the transmission line; and a recognition means, arranged in the other of the wiper driving device and the rain detection device, for recognizing transmitting information from the one of the wiper driving device and the rain detection device to the other of the wiper driving device and the rain detection device, the transmitting information being transmitted in response to the short-circuited signal.

2. The inter-device communication system according to claim 1, wherein:

the transmission means includes a first switching element that is closed based on an input of an external signal related to the transmitting information and a dielectric element that is connected to the first switching element at one end and is grounded at the other end; and the transmission line is connected to a portion between the first switching element and the dielectric element.

3. The inter-device communication system according to claim 2, wherein:

the other of the wiper driving device and the rain detection device includes a second switching element for outputting the signal to the transmission line; and the recognition means includes:

a third switching element that is connected together with the second switching element to the transmission line and opened and closed in accordance with closing and opening of the second switching element; and receiving means for detecting whether the third switching element is opened or closed.

4. The inter-device communication system according to claim 1, wherein:

the one of the wiper driving device and the rain detection device is the wiper driving device that includes determination means for determining a detection period suitable for rain detection based on a position of the wiper and a position of the rain detection device for every wiping period; and the transmission means short-circuits the potential of the signal for a predetermined period from a termination time of the detection period.

5. The inter-device communication system according to claim 4, wherein:

the rain detection device is arranged in a wiping region of the wiper on the windshield glass; and the wiper passes through the rain detection device along the windshield glass in the predetermined period.

6. The inter-device communication system according to claim 1, wherein:

the other of the wiper driving device and the rain detection device is the rain detection device including rain amount signal outputting means for outputting a signal in accordance with the amount of raindrops; and the rain amount signal outputting means outputs a duty signal as its output signal.

7. The inter-device communication system according to claim 6, further comprising:

calibration means for calibrating the potential of the signal to a predetermined potential immediately before a start time of the detection period suitable for rain detection.

8. The inter-device communication system according to claim 1, wherein the one of the wiper driving device and the rain detection device is the wiper driving device and the other of the wiper driving device and the rain detection device is the rain detection device.

9. The inter-device communication system according to claim 1, wherein the transmitting information is sent in an opposite direction to a direction of said signal unidirectionally sent through said single transmission line.

10. An apparatus comprising:
a rain detector;
a wiper driver that operates a wiper, which removes raindrops on a windshield glass, in accordance with an amount of raindrops detected by the rain detector; and
a single transmission line for unidirectionally sending a signal from the rain detector to the wiper driver;
wherein the wiper driver includes circuitry that short-circuits a potential of the signal unidirectionally sent through said single transmission line; and
the rain detector includes circuitry that recognizes transmitting information from the wiper driver which is transmitted in response to the short-circuited signal and in a direction opposite to a direction of said signal unidirectionally sent through said single transmission line.

11. The apparatus according to claim 10, wherein:
the circuitry of the wiper driver that short circuits the potential of the signal unidirectionally sent through the transmission line includes a first switch that is closed based on an input of an external signal related to the transmitting information and a capacitor that is connected to the first switch at one end and is grounded at the other end; and
the single transmission line is connected to a portion of the wiper driver between the first switch and the capacitor.

12. The apparatus according to claim 11, wherein:
the rain detector further includes a second switch that outputs the signal to the transmission line; and
the circuitry of the rain detector that recognizes transmitting information from the wiper driver includes:
a third switch connected together with the second switch to the transmission line and opened and closed in accordance with closing and opening of the second switch; and
a receiver that detects whether the third switch is opened or closed.

13. The apparatus according to claim 10, wherein the wiper driver includes circuitry that determines a detection period suitable for rain detection based on a position of the wiper and a position of the rain detector for every wiping period; and
the circuitry of the wiper driver that short circuits the potential of the signal unidirectionally sent through the transmission line short-circuits the potential of the signal for a predetermined period from a termination time of the detection period.

14. The apparatus according to claim 13, wherein:
the rain detector is arranged in a wiping region of the wiper on the windshield glass; and
the wiper passes through the rain detector along the windshield glass in the predetermined period.

15. The apparatus according to claim 10, wherein the rain detector outputs a duty signal in accordance with the amount of raindrops.

16. The apparatus according to claim 15, further comprising:
a calibrator that calibrates the potential of the signal to a predetermined potential immediately before a start time of the detection period suitable for rain detection.

* * * * *